United States Patent
Stöck

(10) Patent No.: US 11,728,714 B2
(45) Date of Patent: Aug. 15, 2023

(54) METHOD FOR PRODUCING COMPRESSED STRAND

(71) Applicant: JHEECO E-DRIVE AG, Eschen (LI)

(72) Inventor: Martin Stöck, Salez (CH)

(73) Assignee: JHEECO E-DRIVE AG, Eschen (LI)

( * ) Notice: Subject to any disclaimer, the term of this patent is extended or adjusted under 35 U.S.C. 154(b) by 0 days.

(21) Appl. No.: 17/059,341

(22) PCT Filed: May 24, 2019

(86) PCT No.: PCT/EP2019/063468
§ 371 (c)(1),
(2) Date: Nov. 27, 2020

(87) PCT Pub. No.: WO2019/228923
PCT Pub. Date: Dec. 5, 2019

(65) Prior Publication Data
US 2021/0211027 A1    Jul. 8, 2021

(30) Foreign Application Priority Data
May 28, 2018   (DE) .................... 10 2018 208 414.9

(51) Int. Cl.
*H02K 15/12* (2006.01)
*H02K 3/14* (2006.01)
*H02K 15/04* (2006.01)

(52) U.S. Cl.
CPC ............. *H02K 15/12* (2013.01); *H02K 3/14* (2013.01); *H02K 15/0442* (2013.01)

(58) Field of Classification Search
CPC ....... H02K 15/0442; H02K 15/12; H02K 3/14
See application file for complete search history.

(56) References Cited

U.S. PATENT DOCUMENTS

| | | | | |
|---|---|---|---|---|
| 3,431,639 A | * | 3/1969 | Porsch | H02K 15/12 |
| | | | | 174/120 R |
| 11,018,564 B2 | * | 5/2021 | Hashimoto | H02K 15/045 |

(Continued)

FOREIGN PATENT DOCUMENTS

| | | |
|---|---|---|
| DE | 3012496 C2 | 2/1982 |
| DE | 102004005033 A1 | 8/2005 |

(Continued)

OTHER PUBLICATIONS

English Translation of International Search Report from PCT/EP2019/063468 dated Aug. 16, 2019 (2 pages).

*Primary Examiner* — Minh N Trinh
(74) *Attorney, Agent, or Firm* — Calfee, Halter & Griswold LLP

(57) ABSTRACT

The present invention relates to a method for producing a compressed strand (F) from a wire, comprising at least the method steps of: a) shaping said wire (1) into at least one half-loop, ring, or coil in a shaping device (2); b) acting upon said at least one ring, half-loop or coil with adhesive (7); c) twisting said at least one half-loop, ring, or coil into a wire packet (1') in a twisting device (4); d) compacting said wire packet (D) in a compacting device (5), as well as to a method for producing an electric motor, in particular a traction motor for a motor vehicle, comprising a stator (S), where the stator is equipped with at least one compressed strand (F), where the compressed strand (F) is produced according to the method of at least one of the preceding claims, as well as to the use of a compressed strand (F) in an electric motor, in particular in a traction motor for a motor vehicle, characterized in that it is a compressed strand (F) according to at least one of the preceding claims.

15 Claims, 10 Drawing Sheets

(56) References Cited

U.S. PATENT DOCUMENTS

| | | | | |
|---|---|---|---|---|
| 2005/0015978 A1* | 1/2005 | Andersen | ............... | D07B 7/025 |
| | | | | 29/868 |
| 2012/0139383 A1* | 6/2012 | Wolf | .................... | H02K 15/066 |
| | | | | 29/596 |
| 2021/0211027 A1* | 7/2021 | Stöck | ..................... | H02K 15/12 |

FOREIGN PATENT DOCUMENTS

| | | |
|---|---|---|
| EP | 1655740 A1 | 5/2006 |
| EP | 2321830 B1 | 4/2016 |
| WO | 2011040982 A1 | 4/2011 |

\* cited by examiner

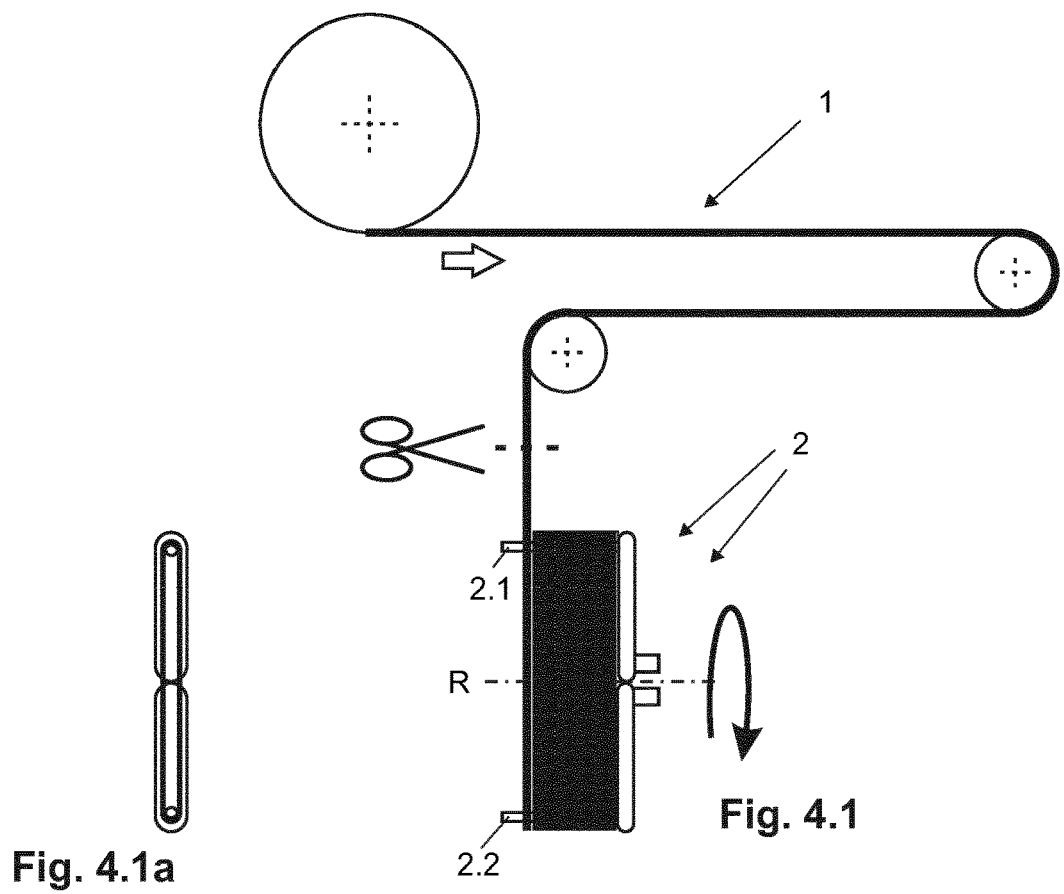
Fig. 4.1a    Fig. 4.1
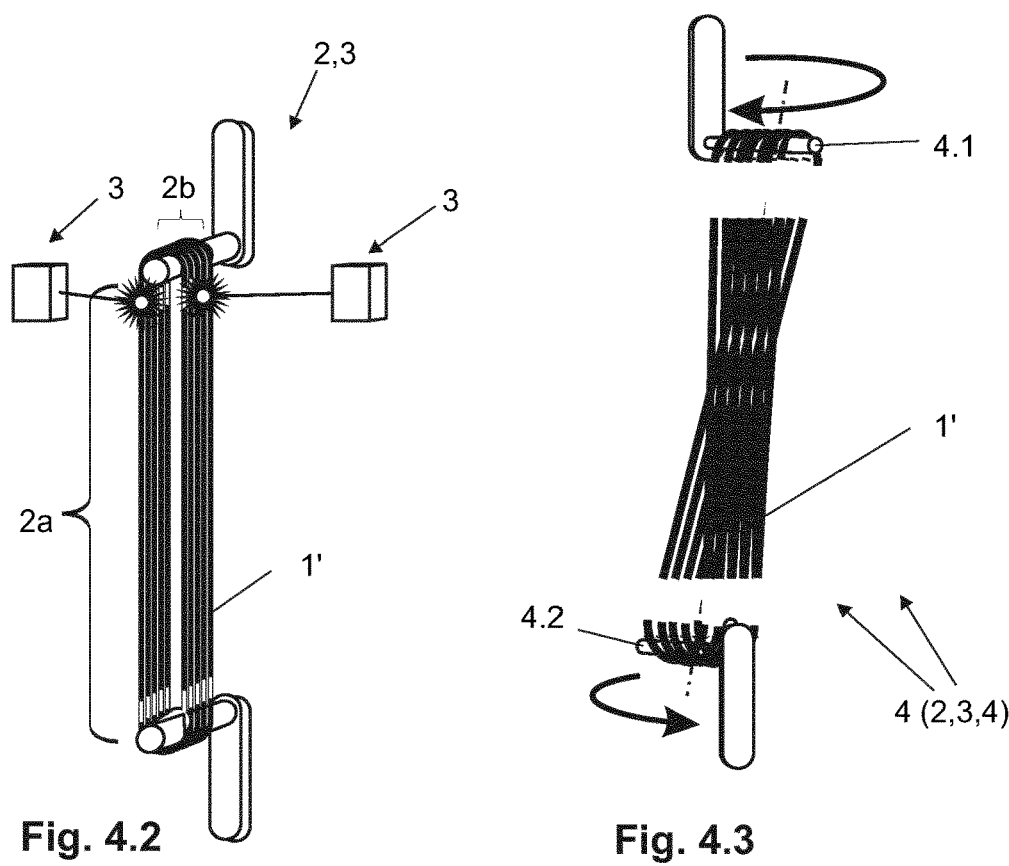
Fig. 4.2    Fig. 4.3

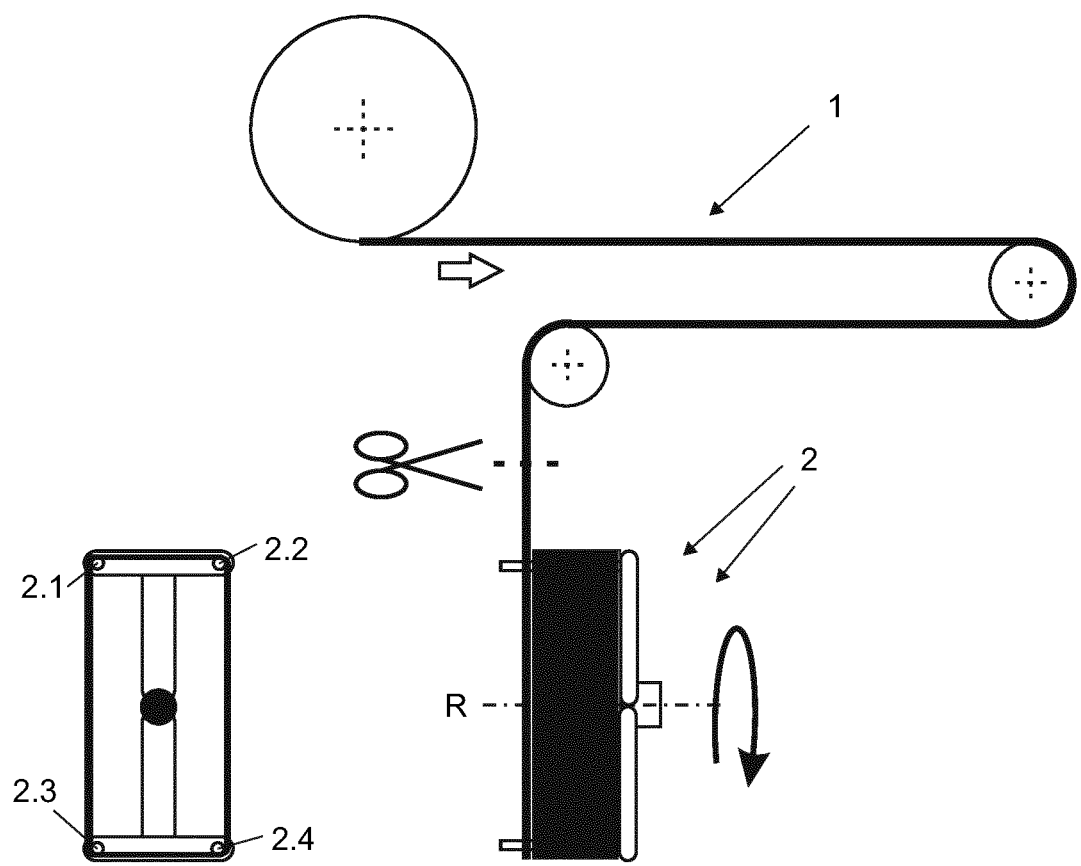
Fig. 5.1aFig. 5.1

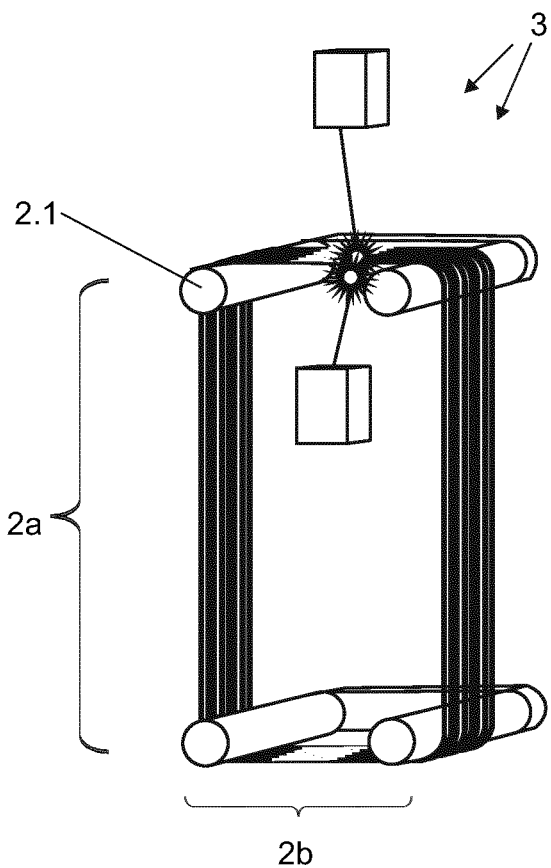
Fig. 5.2
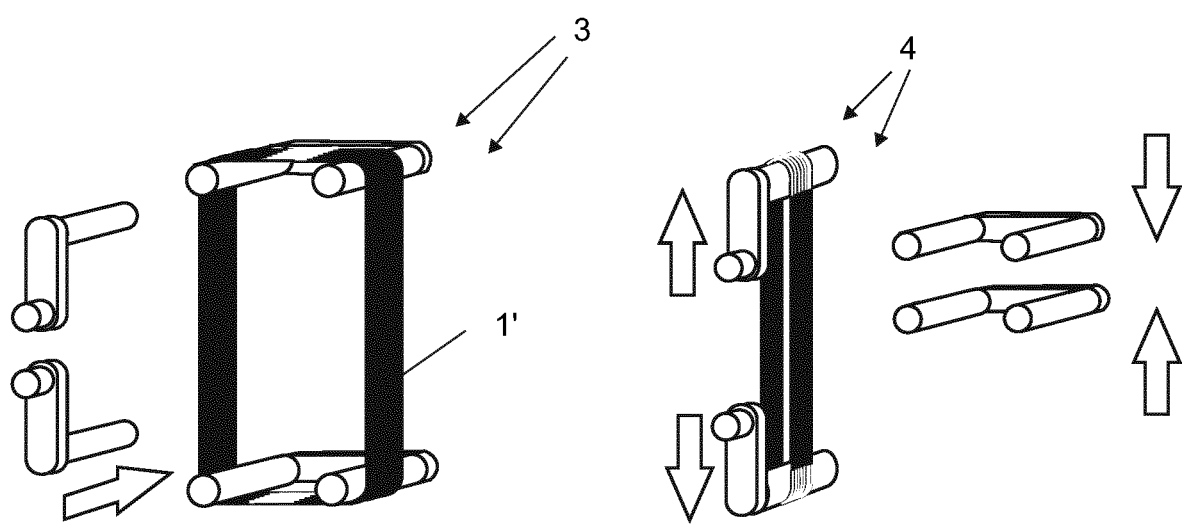
Fig. 5.3  Fig. 5.4

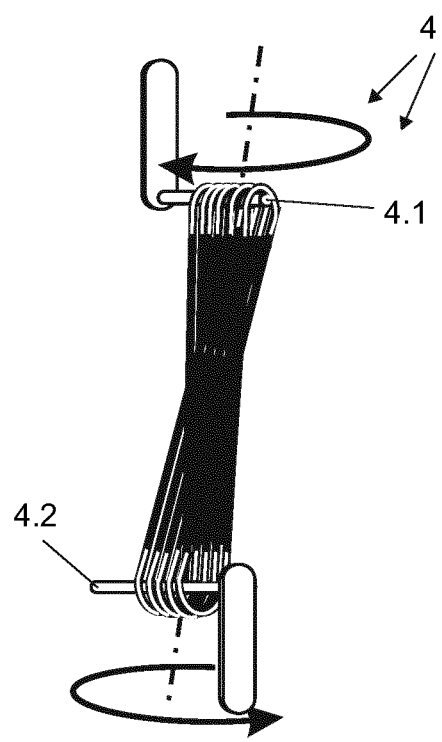
Fig. 5.5

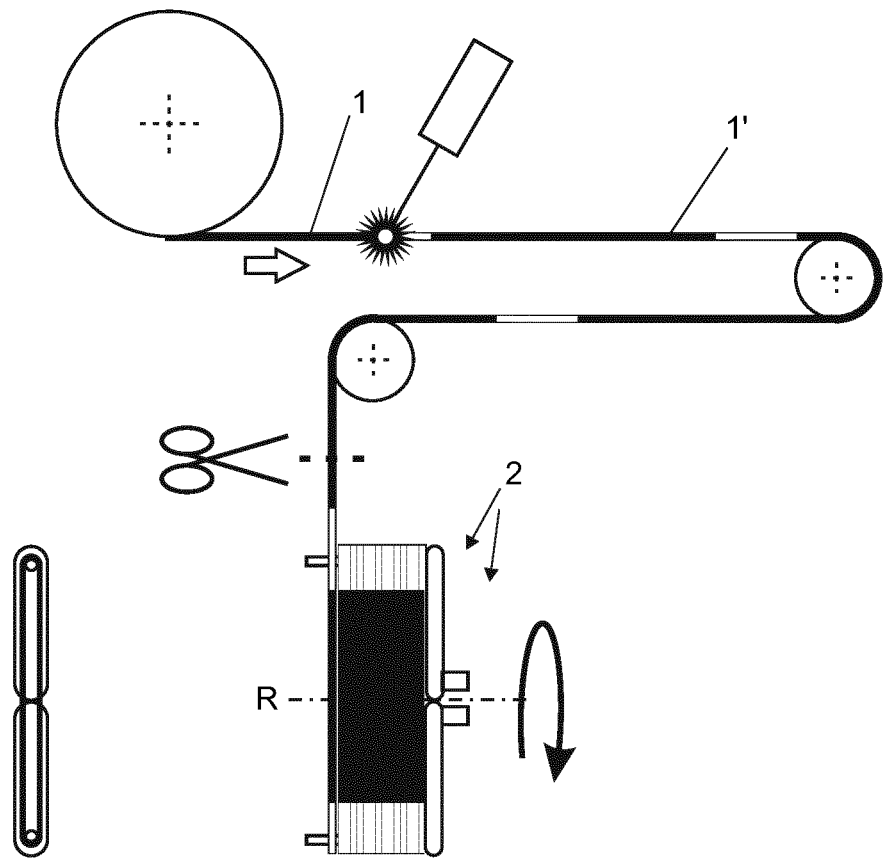
Fig. 6.1a    Fig. 6.1
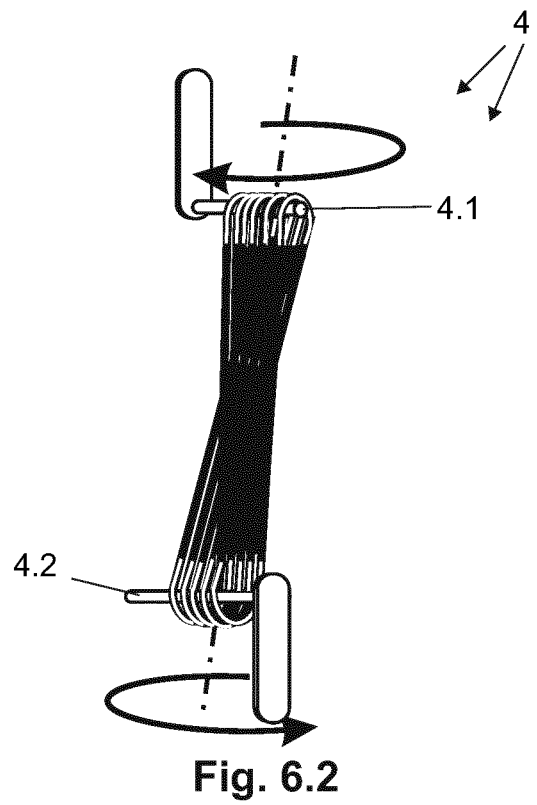
Fig. 6.2

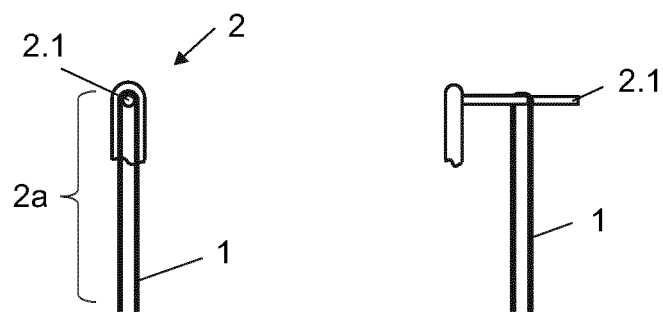
Fig. 7
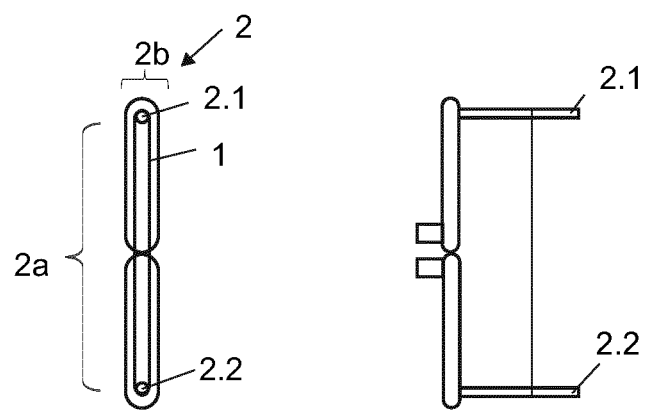
Fig. 8
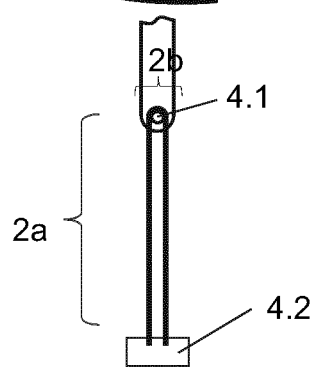
Fig. 9

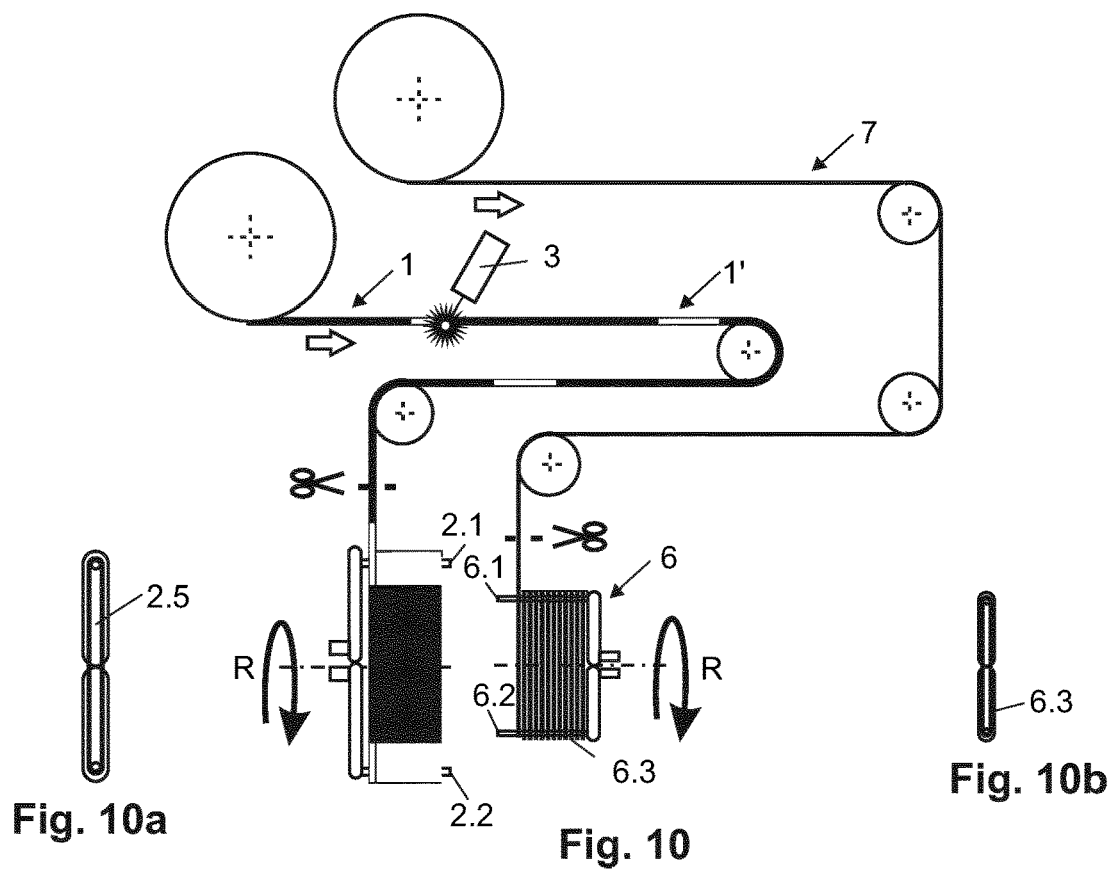
Fig. 10a   Fig. 10   Fig. 10b
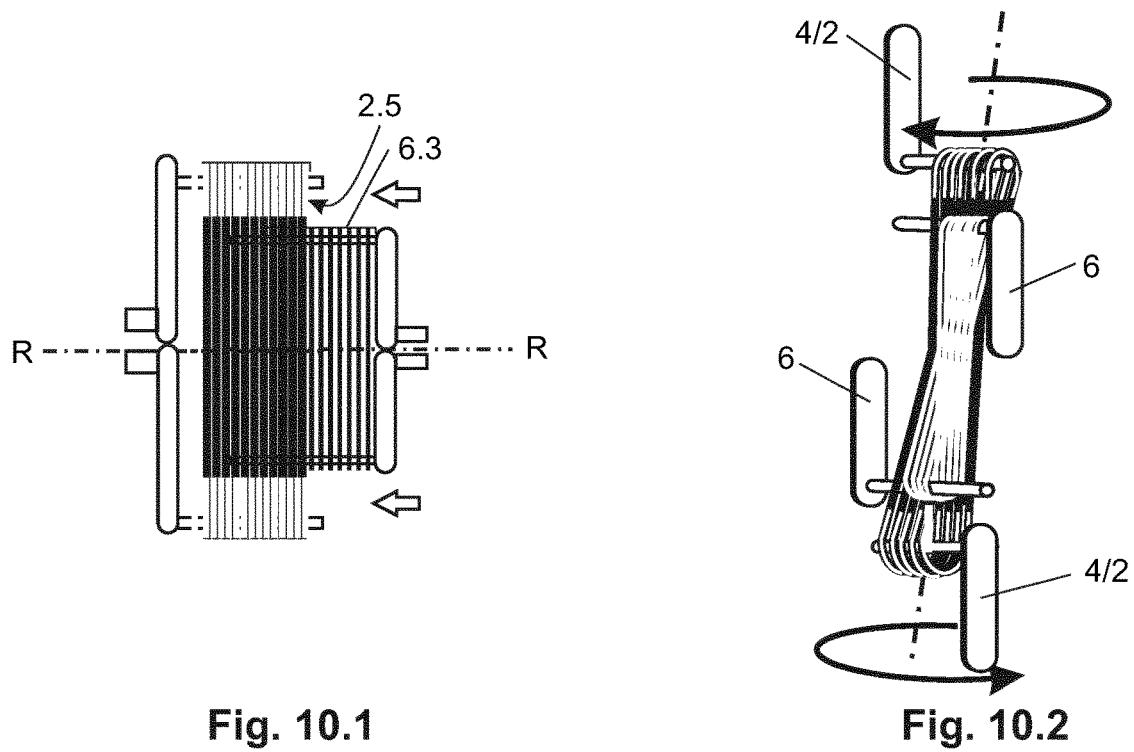
Fig. 10.1   Fig. 10.2

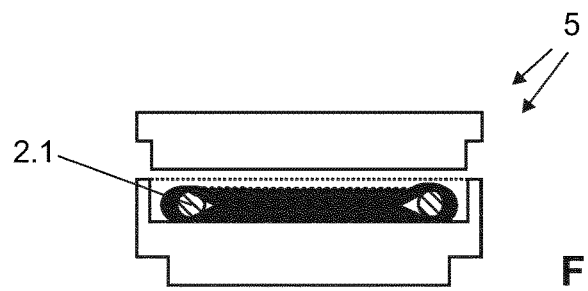
Fig. 15.1
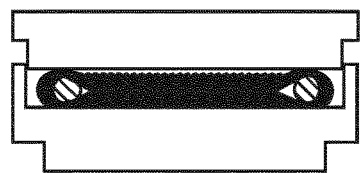
Fig. 15.2
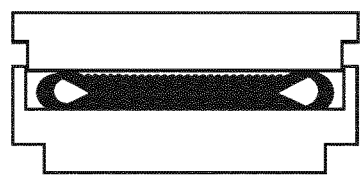
Fig. 15.3
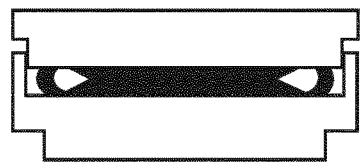
Fig. 15.4
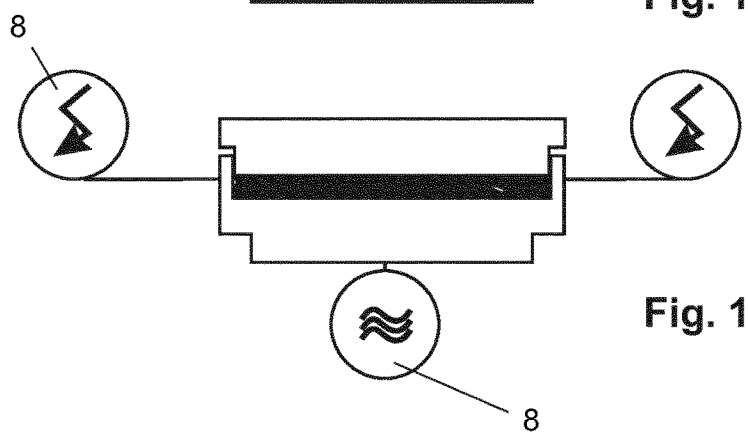
Fig. 15.5
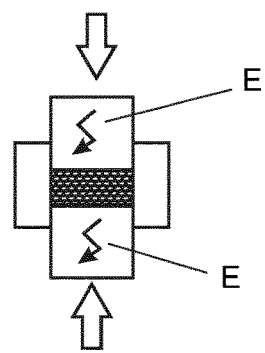
Fig. 16

METHOD FOR PRODUCING COMPRESSED STRAND

CROSS-REFERENCE TO RELATED APPLICATIONS

This application is a 371 of PCT Application No. PCT/EP2019/063468 filed on May 24, 2019, which claims priority to German Application No. 10 2018 208 414.9 filed on May 28, 2018, the contents of which are hereby incorporated by reference as if recited in their entirety.

The present invention relates to a method for producing compressed strand according to claim 1, a method for producing an electric motor according to claim 13, as well as the use of compressed strand according to claim 14.

Compressed strands are litz wires, i.e. twisted or untwisted tufts of wire, which are compacted and thus given a certain cross-sectional shape, typically a rectangular cross-sectional shape.

Insulated wire, in particular varnished wire, is preferably used as the wire for compressed strands.

In the end sections (compressed strand heads), the individual wires are electrically and mechanically connected to one another for the purpose of further contacting. This is done e.g. with ultrasonic or electrode welding, where a sleeve is typically used. Insulating varnish of the wires present in the compressed strand head is always in part burned away and in part squeezed out.

Compressed strands can be used as Milliken conductors in electrical machines, in particular in stators. Segment conductors are conductor sections which are e.g. inserted or drawn into stator slots; the protruding ends of two compressed strands can then be connected directly to form half-coils. The half-coils are likewise connected by being connected accordingly on the oppositely disposed side of the stator. Different winding patterns can be implemented, e.g. a concentrated winding or—of particular interest—a wave winding. Wave winding means that ultimately continuous strands of conductor meander around the stator slots. In the case of a three-phase machine, this is known, for example, from U.S. Pat. No. 9,035,526B2 or DE10113831B4.

The connection of two compressed strands can be effected directly, e.g. by welding two compressed strand heads. For this purpose, the compressed strand heads are sleeved, in particular a sleeve is pressed or welded thereonto. There are two reasons for this, firstly, to create a defined connection surface for welding, secondly, to connect the wire ends in the compressed strand head electrically and mechanically to one another. Examples for this are given e.g. in EP3051669A1.

In addition, additional components of the compressed strand, such as an adhesive, are known which mechanically interconnect the individual wires of the compressed strand. Such a connection can in particular counteract vibrations (noise) and the resulting chafing between the individual wires (risk of short circuit). They arise e.g. when alternating current is applied with cyclic pulling and pushing of the individual wires by the current-induced magnetic fields.

For example, bonding varnish is conceivable as an adhesive. Bonding varnish is to be understood as being adhesive resin that has the task of mechanically connecting the individual wires of a stranded wire or a winding to one another.

The winding wire is there typically covered with a first insulation layer and a second bonding varnish layer. When heated, the bonding varnish melts, adhesively bonds to the other bonding varnish layers and cures irreversibly. The advantage is that the bonding varnish is already present on the wire from the outset, i.e. it is well distributed; the drawback is that the bonding varnish is very brittle (manageability). This use of bonding varnish for adhesively boding individual wires disposed in the stator slot is not to be confused with other options of application. These include e.g. the impregnation and securing of individual wires in the winding head (also protection against external influences), which is irrelevant for the present production of compressed strand. Another aspect is likewise the mechanical fixation of a segment conductor within the slot, which has no common ground with the present invention.

These and other adhesives, in particular in connection with bonding varnish, are known from prior art. In prior art, bonding varnish is applied, for example, by using bonding varnish-coated winding wires that are baked together by heat, as described, for example, in EP2230674. A conceivable bonding varnish application can also be effected by winding with a "wire tandem", consisting of the actual winding wire and an additional adhesive wire, as described, for example, in DE3012496C2 or JPS55147957A. A bonding varnish can also be applied by applying liquid resin onto a stranded wire ("impregnating") with curing while pressing, i.e. impregnation, as described, for example, in DE102004005033A1. Also known is the use of bonding varnish-coated insulation paper in a stator slot, where the bonding varnish is softened by the flow of current and the individual wires are adhesively bonded together, as described, for example, in DE102014100567B5. An application by pumping resin into an extruded insulation sleeve into which a compressed strand blank has already been introduced is also known from EP1523084A1.

In the region of the winding heads free of bonding varnish, for example, DE102015213616A1 has become known which has provided the entire winding with bonding varnish, but only allows it to cure locally, there within the stator slot, so that the winding heads are at least not adhesively bonded to one another. The sole purpose of this is to be able to reduce the height of the winding head in that the adhesively unbonded wires in the winding head can be pressed downwardly towards the stator body.

In the production of the compressed strand, removing the insulation at the head ends for electrical contact of the wires among each other and possibly to sleeves is a challenge. This is all the more true if the compressed strand, in addition to the wire insulation, is to be equipped with adhesive.

When using compressed strands with adhesive application of the individual wires, it is therefore desirable to secure the individual wires of the compressed strand relative to one another or to adhesively bond them to one another, respectively. However, adhesive material in the contact region, i.e. in the head region of the compressed strand, is also undesirable.

Prior art provides no optimal solutions in this regard Essentially, the solutions are based on a subsequent removal of the adhesive from the undesired regions. However, an industrially applicable method would there be helpful in which the undesired regions are not applied adhesive from the outset.

This is where the present invention comes in and proposes an improved method for producing compressed strand, in particular proposes a method for producing compressed strand which enables a selective application of bonding varnish or avoids an application of bonding varnish in the head region of the compressed strand, respectively, in particular at the locations in which a connection, in particular an electrically conductive connection, is to be established or has been established between the wire and the wire or the wire and the sleeve, respectively.

According to the invention, this object is satisfied by a method having the characterizing features of claim 1. Further features and details of the invention arise from the dependent claims, the description, and the drawings. Features and details described in the context of the method of course also apply in the context of devices described and vice versa, so that reference is or can always be made to either with regard to the disclosure of the individual aspects of the invention.

The idea of the invention is to specify an intermediate state in the production of compressed strand, in which (future) wire end sections (head region) and wire intermediate sections (active length) of a compressed strand are present in such a way that a locally limited bonding varnish (or other suitable material) can be applied to the wire intermediate sections.

For this purpose, it is proposed that the at least one ring, half-loop, or coil is acted upon with adhesive after the shaping in the shaping device and prior to the twisting in the twisting device, in particular also prior to compacting the wire packet in a compacting device.

At this stage, the wires are still in a very orderly and accessible state; in particular, the coil, but also the half-loop or ring, comprises an interior space into which adhesive can be introduced. Possibilities also arise to reach the individual wires, for example, of the coil, in such a way that the adhesive can be woven in, wrapped around, or brushed on or sprayed on. As a result, there are good options between the aforementioned processing states to apply adhesive in a selected manner, but in particular to avoid subsequent removal of the adhesive.

Further advantages of the proposed invention include inter alia the fast and defined application of adhesive, in particular bonding varnish, as compared to e.g. vacuum impregnation, i.e. in particular, increased cycle times when applying adhesive, in particular when applying bonding varnish. Furthermore, a defined quantity of adhesive applied, in particular bonding varnish, can be applied and uniform distribution between the individual wires can be obtained. This results in increased mechanical strength in the strand and therefore in less vibrations and less noise emissions in the installed state/electric motor. It is also advantageous to provide a clean compressed strand head of consistent quality which can be contacted in a reliable manner, for example, in the winding head of an electric machine. The cycle times for the contacting process can be accelerated, since disruptive impurities in the head end are largely non-existent.

Further advantageous configurations of the proposed invention arise in particular from the features of the dependent claims. The objects or features of the various claims can in principle be combined with one another at random.

In one advantageous embodiment of the invention, it can be provided that the wire is an insulated, preferably a varnish-insulated wire, where the insulated wire is partially stripped of insulation prior to or after shaping. This measure can accordingly ensure that the insulated wire is stripped of insulation at those points that are intended for assembly or electrical contact.

In a further advantageous embodiment of the invention, it can be provided that the at least one half-loop, ring, or coil is received on the shaping device, where the shaping device forms an interior space together with the at least one half-loop, ring, or coil, where the adhesive is introduced into the interior space. Such a procedure is particularly advantageous since the wire is disposed in an intermediate state on the shaping device anyway and the resulting interior space is very well suited for the introduction of the adhesive. The adhesive can there be adapted in particular to the requirements of the interior space both with regard to its position and its spatial configuration, for example, it can thus be ensured in a simple manner that the head ends are not acted upon with adhesive, for example, in that the spatial shape of the adhesive is set up in such a way that this region can never be reached by the adhesive.

It can be provided in a further advantageous embodiment of the invention that the adhesive is arranged on an adhesive carrier, where the adhesive device composed of adhesive and the adhesive carrier is introduced into the interior space. Such a procedure is particularly suitable for an adhesive that is present in the form of a wire or tape, therefore in particular for adhesive that does not have any structure that is directly adapted to the interior space and possibly also does not have the necessary inherent stability. In this respect, for example, an adhesive wire can be wound onto a winding holder, comparable to a winding holder for the insulated or partially stripped wire, and accordingly be introduced with the adhesive carrier into the interior space.

It can be provided in a further advantageous embodiment of the invention that the at least one half-loop, ring, or coil is received on the shaping device, where the adhesive is wound at least in sections around the at least one half-loop, ring, or coil. Such a variant is particularly suitable for wire-shaped or tape-shaped adhesives. Preferably the long sides of the at least one half-loop, ring, or coil are wrapped.

It can be provided in a further advantageous embodiment of the invention that the at least one half-loop, ring, or coil is received on the shaping device, where the at least one half-loop, ring, or coil is equipped with adhesive in the manner of a weaving technique, in particular a tape or wire, such as a warp thread or weft thread, is woven in as an adhesive into the at least one half-loop, ring, or coil This variant of application of an adhesive is also preferably suitable for wire or tape-shaped adhesives. Furthermore, an extremely selective application of the adhesive can also be carried out there, in particular certain points, such as the future head regions, can be omitted.

As already mentioned above in several passages, it can preferably be provided that the adhesive is configured as a wire or tape. Numerous possibilities were presently shown as to how this inexpensive and sufficiently available form of adhesive can be used with sufficient process reliability for the method proposed according to the invention.

It can be provided in a further advantageous embodiment of the invention that the at least one half-loop, ring, or coil is received on the shaping device, where the adhesive is configured to be liquid or powdery and is applied at least in sections onto the at least one half-loop, ring, or coil, in particular by brushing, spraying and/or by electrostatic attraction. This procedure as well is advantageously suitable for the selective application of adhesive. It can be provided in this context that those regions, such as the head regions, are covered by a suitable curtain during the application.

It can be provided in a further advantageous embodiment of the invention that the adhesive is formed from a material that is suitable for mechanical fixation of the wires to one another, in particular that the adhesive contains resins, polymers, preferably thermoplastics and/or thermosetting plastic material, polyesters and/or polyamide-imides.

It can be provided in a further advantageous embodiment of the invention that the adhesive is bonding varnish.

It can be provided in a further advantageous embodiment of the invention that the wire packet is compacted in a compacting device, where the compacting device is equipped with a curing device which transforms the adhesive to its cured state. The curing device can preferably be matched to the adhesive used, so that handling the adhesive or curing process can be ensured in a reliable manner.

It can be provided in a further advantageous embodiment of the invention that the curing device can be configured as a heater, a UV light source, and/or an electrical connection for the compressed strand. The compacting device designed as a press can also activate an adhesive that can be activated, for example, by pressure.

A further object of the present invention is to propose an improved method for producing an electric motor, in particular to propose a method for producing an electric motor that can be carried out more efficiently.

According to the invention, this object is satisfied in that the production method according to the invention for compressed stranded wire is part of the production method for the electric motor. In this respect, the compressed strand is produced according to the method of the invention and installed in the electric motor, preferably in the stator of the electric motor. As a result, the advantages of the production of compressed strand according to the invention can be utilized for the production of electric motors, where the production can be carried out in particular more efficiently since subsequent removal of the adhesive can substantially be dispensed with.

A further object of the present invention is to propose advantageous use of the compressed strand produced according to the invention.

According to the invention, this object is satisfied by use according to claim 14.

Further features and advantages of the present invention will become apparent from the following description of preferred embodiments with reference to the accompanying figures. Schematically shown in FIG. 1 is a compressed strand produced according to the method of the invention;

FIG. 2 in a lateral view is a stator of an electric motor, in particular an electric traction motor, e.g. for an automobile, with a compressed strand produced using the method according to the invention;

FIG. 3 In a face side view is a stator of an electric motor, in particular an electric traction motor, e.g. for an automobile, with a compressed strand produced using the method according to the invention;

FIG. 4.1 is the shaping of an insulated wire into a coil on a winding holder with two fingers;

FIG. 4.1a is a top view onto the winding holder according to FIG. 4.1;

FIG. 4.2 is the stripping of insulation from the wire on the winding holder according to FIGS. 4.1/4.1a;

FIG. 4.3 is the twisting of the wire on the winding holder/twisting device;

FIG. 5.1 is the shaping of an insulated wire into a coil on a winding holder with four fingers;

FIG. 5.1a is a top view onto the winding holder according to FIG. 5.1;

FIG. 5.2 is the partial stripping of insulation from the coil on the winding holder according to FIG. 5.1/5.1a;

FIG. 5.3/5.4 is the transfer of the coil from the four-finger winding holder to a two-finger winding holder;

FIG. 5.5 is the twisting of the coil on the winding holder/twisting device;

FIG. 6.1 is the partial stripping of insulation from the insulated wire prior to the shaping on a winding holder—shaping of a wire partially stripped of insulation into a coil on a winding holder with two fingers;

FIG. 6.1a is a top view onto the winding holder according to FIG. 6.1;

FIG. 6.2 is the twisting of the winding on the winding holder/twisting device;

FIG. 7 is a winding holder with one finger and a half-loop (top view/lateral view);

FIG. 8 is a winding holder with two fingers and a ring (top view/lateral view);

FIG. 9 is a twisting device with one finger, a tong tool, and a half-loop;

FIG. 10 is the partial stripping of insulation from the insulated wire and winding into a coil on a two-finger winding holder, as well as winding a bonding varnish wire on a two-finger winding holder into a bonding varnish wire coil;

FIG. 10a is a two-finger winding holder with a wound wire in a top view;

FIG. 10b is a two-finger winding holder with a wound varnish wire in a top view;

Figure 11:
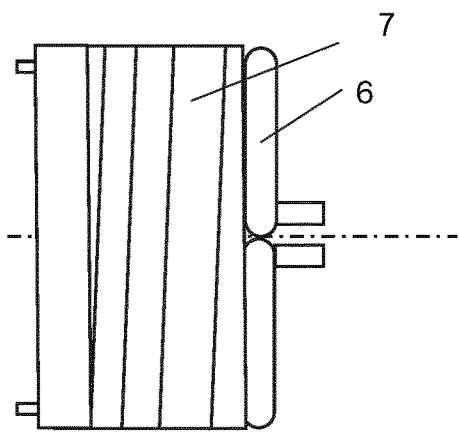
Figure 12:
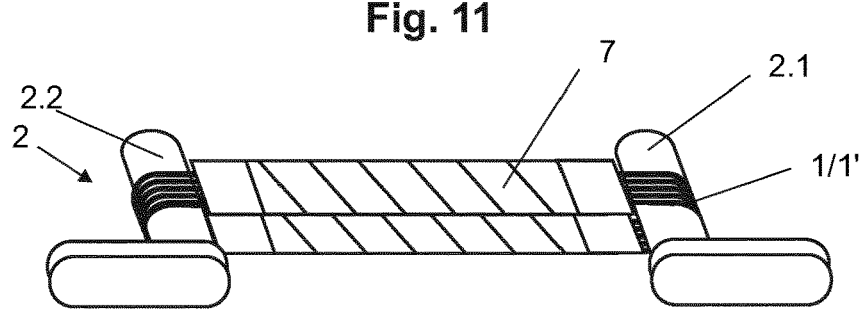
Figure 13:
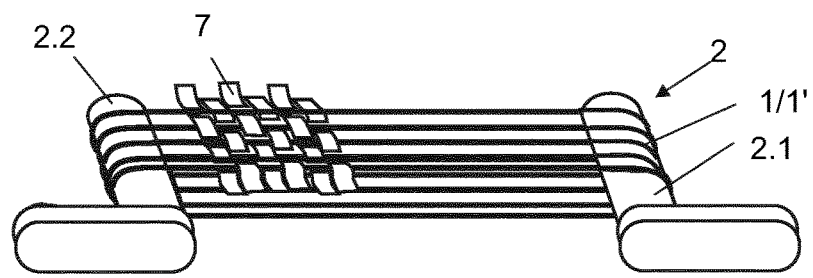
Figure 14:
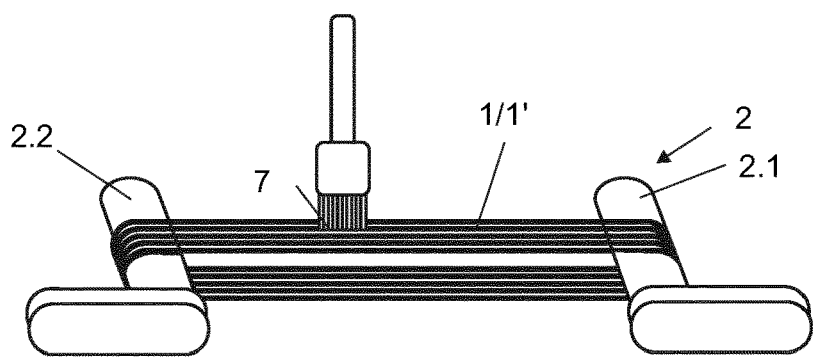

FIG. 10.1 is the insertion of the two-finger winding holder with the bonding varnish wire coil into the interior space of the two-finger winding holder with the coil made of wire 1 partially stripped of insulation;

FIG. 10.2 is the twisting of the wire coil together with the bonding varnish wire coil;

FIG. 11 is a bonding varnish tape on a two-finger winding holder;

FIG. 12 is a bonding varnish tape wound around the long sides of a wire coil;

FIG. 13 is a bonding varnish tape woven into the long sides of a wire coil;

FIG. 14 is brushing a wire coil with liquid adhesive;

FIGS. 15.1-15.5 is the compacting of the twisted wire packet in a press;

FIG. 16 is the electrode welding of the head ends of the compressed strand for the electrical and mechanical connection of the wire sections disposed there.

A possible method of producing a compressed strand can comprise the steps of shaping a wire into at least one half-loop, coil or ring;
twisting the at least one half-loop, coil, or ring into a wire packet;
compacting the wire packet, as well as
optionally partially stripping insulation from the wire prior to or after shaping.

A coil is to be understood to mean a spiral-shaped structure with several turns. The ends are typically not connected to each other. In principle, however, it is possible to connect the ends of the coil. The coil does not necessarily have to be configured to be circular, but the coil instead has a more rectangular shape with preferably rounded corners. In this respect one can speak of two long sides 2a and two short sides 2b of the coil.

A ring is to be understood to mean a closed structure of a wire with the number of turns 1, i.e. the ends are connected to one another. The ring does not necessarily have to be configured to be circular, but the ring instead has a more rectangular shape with preferably rounded corners. In this respect one can speak of two long sides 2a and two short sides 2b of the ring.

A half-loop is intended to mean a U-shaped structure that is open on one side. The wire does not describe a complete turn and the ends are not connected to each other. In this respect one can speak of two long sides 2a and one short side 2b of the half-loop.

The wire is an insulated, preferably varnish-insulated wire which is partially stripped of insulation prior to or after shaping. At the core, the wire is an electrically conductive wire, preferably made of copper, aluminum or copper and/or aluminum alloys, respectively.

The insulated wire is typically present on a reel from which the wire is drawn and supplied to the production process as a wire supplied in a straight or substantially straight manner. This means that the wire is wound off a reel and is formed into the intended shape of the half-loop, ring, or coil only in the shaping process.

The result of the production process is a compressed strand F. The compressed strand comprises a first head end and a second head end. The head ends of the compressed strand (more precisely the wire sections located there) are electrically and mechanically interconnected, where this can be done with the aid of sleeves H2 or H2, respectively. A wire packet D is arranged between the head ends. The wire packet consists of a number of wires which are typically twisted together and, as a wire packet, are preferably enclosed by a main insulation layer.

The compressed strand is additionally compacted and preferably has a rectangular or trapezoidal cross-sectional area.

The individual method steps shall be explained below:
Shaping

Shaping takes place in a shaping device 2. So-called winding holders are conceivable as shaping devices.

In a simplest embodiment, the winding holder comprises a finger 2.1 over which the insulated wire is quasi placed and shaped into a half-loop. Several wires can be placed one after the other onto the finger and accordingly be shaped into several half-loops. The resulting half-loops can lie adjacent to one another and/or one above the other on the finger.

In a further embodiment, the winding holder can comprise two fingers 2.1, 2.2. The two fingers are aligned parallel or substantially parallel to one another and spaced from one another. One or more rings of the wire can be pushed onto the winding holder. The rings can lie adjacent to one another and/or one above the other on the fingers.

In a further embodiment, the winding holder can comprise two fingers 2.1, 2.2 and an axis of rotation R. The axis of rotation is preferably arranged between the fingers and parallel to the fingers. This is essentially a kind of reel on which the wire can be wound into a coil. The wires of the coil can be arranged next to one another and/or one above the other.

In a further embodiment, the winding holder can comprise four fingers 2.1 to 2.4. The four fingers are aligned parallel or substantially parallel to one another and spaced from one another. In a top view, the four fingers preferably form the corners of a rectangle or square. One or more rings of the wire can be pushed onto the winding holder. The rings can lie adjacent to one another and/or one above the other on the fingers.

In a further embodiment, the winding holder can comprise four fingers 2.1 to 2.4 and an axis of rotation R. The four fingers are aligned parallel or substantially parallel to one another and spaced from one another. In a top view, the four fingers preferably form the corners of a rectangle or square. The axis of rotation is preferably arranged between the fingers, quasi at the center of the rectangle or square, and parallel to the fingers. This is essentially a kind of reel on which the wire can be wound into a coil. The wires of the coil can be arranged next to one another and/or one above the other.

Basically, a variant with three or more fingers is also conceivable.

The shaping device with the coil or the ring or the rings together with the fingers on which they are received, respectively, defines an interior space, in particular with an open cross section, which can also be referred to as an insertion cross section 2.5 for an adhesive or adhesive device to be described in more detail. The same also applies to the half-loop, where the interior space there is open also in this direction due to the lack of a short side.

The result of the shaping process is the shaping of a wire into at least one half-loop, ring, or coil.
Stripping Insulation The partial stripping of insulation is done using an insulation stripping device 3.

The partial stripping of insulation can be done mechanically or abrasively, in particular by grinding and/or sandblasting. Chemical and/or thermal methods, in particular using cold embrittlement, laser sublimation, induction heating, etc., are also conceivable. In principle, any method is conceivable there which enables the removal of the insulation of the wire. Partial stripping means that a section of the insulated wire extending in the longitudinal direction is freed from the insulation material, whereby "freeing" is to be understood in technically relevant categories. Essentially, it is crucial that an electrically conductive surface of the wire is exposed.

The insulation can be stripped either prior to or after shaping.
Stripping Insulation after Shaping Insulated wire 1 is already shaped but basically still held on respective shaping device 2 so that stripping insulation is basically possible on those sections of the at least one half-loop, ring, or coil that are exposed or, in other words, not in contact with a finger. Depending on the shaping device, preferred sections arise there that are to be or can be stripped of insulation, respectively.

In the case of winding holder 2 with one finger 1, the region of the half-loop immediately adjacent to the finger and at the end side of the half-loop can be considered.

In the case of winding holder 2 with two fingers, the regions of the coil or the rings directly adjacent to the fingers can be considered. Quasi the ends of long sides 2a are stripped of insulation.

In the case of winding holder 2 with four fingers 2.1 to 2.4, the regions of the coil or the rings between two fingers can be considered, preferably on the shorter sections of the coil or the rings if the fingers form, for example, the corners of a rectangle. Quasi the short sides are stripped of insulation.

The result of the insulation stripping process is a coil or rings or half-loops with partially stripped wires.
Stripping Insulation Prior to Shaping In an alternative embodiment of the method, it can be provided that the insulation is stripped prior to shaping, in particular also prior to the wire being received on the shaping device. For the remainder, reference can substantially be made to the features already outlined above.

An insulated wire 1 preferably supplied from a reel is there first partially stripped of insulation using an insulation stripping device 3 in order to then be shaped into at least one half-loop, ring, or coil using a shaping device 2. A rotatable two-finger winding holder is preferably conceivable as shaping device 2. The synchronization of stripping the insulation to the winding holder is preferably carried out in such a way that the regions of the wire stripped of insulation rest in the region of fingers 2.1, 2.2.

The result of the insulation stripping process is a coil or rings or half-loops with partially stripped wires. It becomes apparent from a synopsis with the outer shape of the at least one half-loop, ring, or coil and the regions stripped of insulation which region is meant by the head region, in particular the region stripped of insulation and/or the end or end region of the elongate at least one half-loop, ring, or coil.

Adhesive Application

According to the invention, adhesive is applied prior to twisting and in particular after shaping. In other words, the state that the wire is disposed in the half-loop(s)/ring(s)/coil(s) state, i.e. in particular on shaping device 2, preferably the winding holder, is utilized. It is provided there in particular that the shaping device is formed as a winding holder, comprising at least two fingers 2.1, 2.2 on which the wire is received to form at least one ring or coil, respectively. Alternatively, it can be provided that the winding holder comprises only one finger 2.1 and at least one half-loop is received on the finger.

Adhesive 7 can be present in an initial state, i.e. before the intended adhesive bonding or curing, respectively, basically in solid or liquid form. In solid form, a spatial configuration as a wire or tape is regularly provided. However, the adhesive can also be part of an adhesive device, comprising, for example, an adhesive carrier 6 with two fingers 6.1, 6.2, on which the wire or tape-shaped adhesive is rolled up to form an adhesive coil. The adhesive device comprises in particular an external spatial extension and an external cross section 6.3 with which the adhesive device can be inserted into above-described insertion cross section 2.5 of shaping device 2. In principle, monolithic adhesive 7 is also conceivable which has, for example, a cuboid-shaped spatial configuration and can be inserted into interior space 2.5 without an adhesive carrier 6.

Adhesive 7 is to be understood as any material that is suitable for mechanically affixing the wires to one another. These include resins, any polymers (in particular thermoplastics and thermosetting plastic materials), in particular bonding varnish, polyester (typical polymer), or polyamide-imides (typical polymer).

Various, not exhaustively listed, options are conceivable for the application of adhesive 7.

The coil(s) or half-loop(s) or ring(s) received on shaping device 2, together with fingers 2.1, 2.2 on which they are received, define interior space 2.5 with the insertion cross section already described above. In the axial direction of the fingers, a possibility of insertion for adhesive device 6, 7 outlined above arises, quasi positioning the adhesive in the coil(s) or half-loop(s) or ring(s). For this purpose, however, adhesive device 6, 7 should have a smaller external cross section 6.3 as the previously outlined insertion cross section 2.5.

A monolithic block of adhesive 7, which, like the adhesive device, is inserted into interior space 2.5, is also conceivable as a spatial structure for this variant. In this case it is again crucial that the outer cross section of the adhesive is smaller than the insertion cross section.

It can be provided in a further variant of the production method that the coils, rings or half-loops are equipped with adhesive 7 in the manner of a weaving technique, in particular a tape or a wire such as a warp thread or weft thread is woven as adhesive into the coils, rings or half-loops. Preferably the long sides of the coil(s), ring(s) or half-loop(s) are equipped with adhesive in the manner of a weaving technique. For this purpose, a tape or wire such as a warp thread or weft thread is woven as an adhesive into the long sides of the rings or loops. The long sides are preferably at a certain distance from one another.

It can be provided in a further variant of the production method that a coil or several rings or half-loops, respectively, are received on the shaping device, where adhesive 7 is wound around the coils or the rings at least in sections. The long sides of the rings or loops are there typically at least partially, preferably entirely, enclosed, preferably wrapped with an adhesive. A tape or wire can be used as adhesive.

In a further variant of the production method, the long sides of the rings or loops are brushed or sprayed with an adhesive 7, preferably in liquid or powder form. It can advantageously be provided in this context that the head regions, i.e. regions that have already been stripped of insulation or regions to be stripped of insulation, are protected by a suitable curtain before the adhesive is applied.

It becomes apparent that the head regions of the at least one half-loop, ring, or coil to be twisted are generally not acted upon with the adhesive, in particular since the later connection regions in the head region can be selectively omitted, for example in that the head regions run around the fingers and cannot be reached by the adhesive for reasons inherent to the system. There, the specific spatial configuration and positioning of the adhesive, in particular its cross section, can be used to influence the regions in which the adhesive is likewise to be twisted.

Half-loop(s)/ring(s)/coil(s) equipped with adhesive in this manner can be twisted. In this regard, reference can be made to the process outlined above. Depending on the selection of adhesive with regard to its curing properties, a mechanical connection between the wires of the wire packet can already exist at this point in time.

Twisting

The coil or the rings or half-loops are twisted by way of a twisting device 4. The twisting device substantially comprises a first gripper 4.1 for the first distal end of the coil or the rings or half-loops, as well as a second gripper 4.2 for the second distal end of the coil or the rings or half-loops. The grippers are rotated approximately about the longitudinal axis of the coil or the rings or half-loops, so that the wires are twisted.

In a first embodiment of the twisting device, the first gripper is formed by a finger and the second gripper is formed by a tong tool. This twisting device is preferably suitable for twisting half-loops. The tong tool grips the free ends of the half-loops while the finger grips the short sides of the half-loops. To this end, the first finger of the twisting device can also be the first finger of the shaping device. In this case, the shaping device can be equipped with an additional mechanism that enables the finger and the tong tool to be rotated against one another.

In a first embodiment of the twisting device, the first gripper is formed by a first finger and the second gripper is formed by a second finger. This twisting device is preferably suitable for twisting the coil or the rings. The fingers grip the respective distal coil ends or ring ends, respectively, i.e. the short sides. To this end, the first finger of the twisting device can also be the first finger and the second finger of the twisting device can be the second finger of the shaping device, respectively. In this case, the shaping device can be equipped with an additional mechanism that enables the fingers to be rotated against one another.

If the shaping device is equipped with four fingers, then the rings or the coil wound thereon can be transferred to a twisting device with two fingers. The twisting is then preferably done using this twisting device. In this regard, reference can be made to the explanations provided above.

The result of the twisting process is a twisted wire packet.

Compacting

Compacting takes place in a compacting device 5, in particular a press.

The twisted wire packet is pressed in a compacting process into a compressed strand F. The preceding method steps ensure that the respective distal ends of the twisted wire packet, i.e. the head regions, are stripped of insulation. If the ends still contain partially insulated wire, they can be cut off, but do not necessarily need to be.

In addition, the compacting process or the compacting device, respectively, can be equipped with a curing process or a curing device 8 for the adhesive.

For example, a heatable press mold can be used as curing device 8 if the compacting device is configured, for example, as a press. However, it is also conceivable that the curing device has connection terminals for the sleeves of the compressed strand so that the compressed strand itself can be acted upon with current and heated. Selected adhesives, such as bonding varnish, can be activated e.g. thermally, by electricity, by UV light, or pressure. The compacting device can there contain the appropriate curing device for activating the adhesive.

The result of the compacting process is a compressed strand F, in particular a compressed strand which exhibits high mechanical cohesion due to the adhesive.

The end sections of the compressed strands can then be electrically and mechanically connected to one another in a further process step. FIG. 16 shows an electrode welding method with two welding electrodes E in which the wire sections of the head ends are electrically and mechanically interconnected. A sleeve is not absolutely necessary due to the head sections already being stripped of insulation.

A preferred embodiment of the invention is the introduction of a bonding varnish wire, wound as a coil on a two-finger winding holder, into the interior space of a wire coil that is received on a two-finger winding holder.

Additional Method Steps/Further Aspects of the Invention

Additional, but not exhaustively listed, method steps can be, for example, the application of a main insulation layer around the compressed strand, e.g. by extrusion.

Compressed strands of a higher order can also be produced. This means that strands are twisted with strands to form a new strand (of a higher order). This can be accomplished as part of the "twisting" method step.

The shaping device, the insulation stripping device, and/or the twisting device can preferably be combined to one assembly. In particular the fingers can have different functions (winding, twisting, . . . ). Of course, the devices can also be configured separately.

The configurations are generally not limited to the production of compressed strands with sleeves. Unless already indicated, the explanations can also be applied analogously to compressed strands without sleeves.

Figure 1:
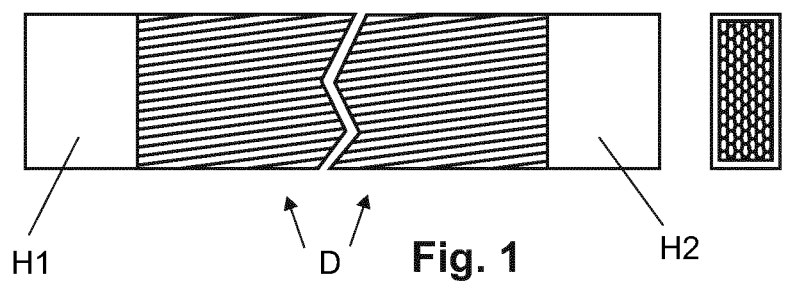
Figure 2:
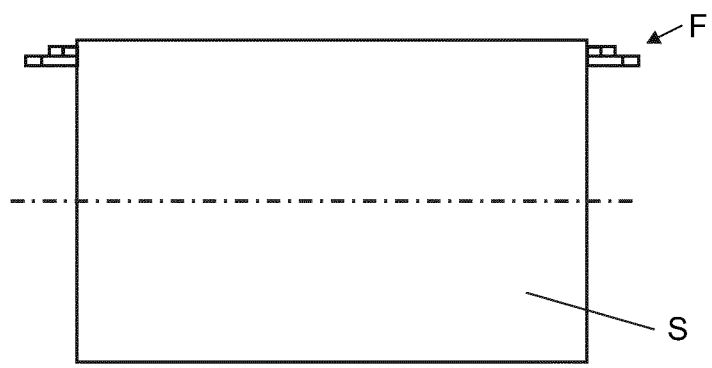
Figure 3:
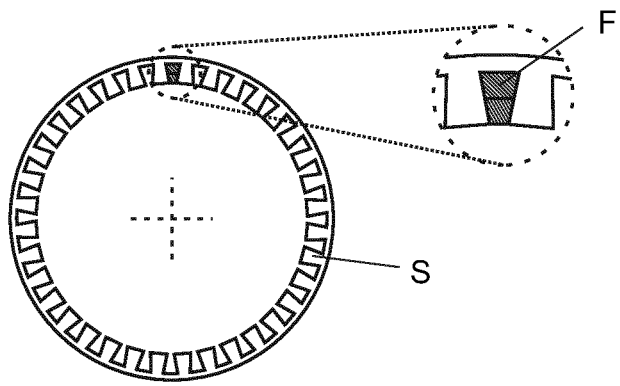

As already explained above, the compressed strand produced according to the invention is advantageously suitable for producing an electric motor, in particular its stator S. Accordingly, the advantages of the compressed strand production method according to the invention can be used for producing an electric motor, in particular its stator. A stator S of an electric motor is shown by way of example in FIGS. 1 to 3.

The compressed strand produced according to the invention can there preferably be used in the stator S of an electric motor.

Methods or uses of the kind described above are preferably employed in the production of electric motors, in particular in vehicles. The electric motor is preferably a traction motor for a motor vehicle.

LIST OF REFERENCE CHARACTERS

The following reference characters are used in the figures:

F compressed strand
H1 sleeve/head end
H2 sleeve/head end
D wire packet
S stator
R axis of rotation
1 insulated wire
1' wire partially stripped of insulation
2 shaping device, in particular winding holder
2.1 first finger
2.2 second finger
2.3 third finger
2.4 fourth finger
2.5 Interior space/insertion cross section
2a long side
2b short side
3 insulation stripping device, in particular laser
4 twisting device
5 compacting device, in particular press
6 adhesive carrier
6.1 first finger
6.2 second finger
6.3 external spatial extension/external cross section
7 adhesive (bonding varnish wire/bonding varnish tape)
8 curing device

The invention claimed is:

1. A method operatively associated with a number of devices for producing a compressed strand from an insulated wire, comprising the steps of:
    shaping said insulated wire into a coil shape in a shaping device;
    partially stripping insulation from the insulated wire by an insulation stripping device;
    acting upon said coil shape with an adhesive;
    twisting said coil shape into a wire packet in a twisting device; and
    compacting said wire packet in a compacting device;
    wherein the number of devices includes an adhesive device, the shaping device, the stripping device, the twisting device, and the compacting device.

2. The method according to claim 1, further comprising receiving said coil shape on said shaping device, where said shaping device forms an interior space together with said coil shape, and introducing said adhesive into said interior space.

3. The method according to claim 2, further comprising introducing said adhesive device into said interior space, wherein said adhesive is arranged on an adhesive carrier and where the adhesive device comprises said adhesive and said adhesive carrier.

4. The method according to claim 1, further comprising receiving said coil shape on said shaping device, where said adhesive is configured to be liquid or powdery and is applied at least in sections onto said coil shape by at least one of brushing, spraying or electrostatic attraction.

5. A method operatively associated with a number of devices for producing a compressed strand from an insulated wire, comprising the steps of:
- shaping said insulated wire into a ring shape in a shaping device;
- partially stripping insulation from the insulated wire by an insulation stripping device;
- acting upon said ring shape with an adhesive;
- twisting said ring shape into a wire packet in a twisting device; and
- compacting said wire packet in a compacting device;
- wherein the number of devices includes an adhesive device, the shaping device, the stripping device, the twisting device, and the compacting device.

6. The method according to claim 5, further comprising receiving said ring shape on said shaping device, where said shaping device forms an interior space together with said ring shape and introducing said adhesive into said interior space.

7. The method according to claim 6, further comprising introducing said adhesive device into said interior space, wherein said adhesive is arranged on an adhesive carrier, where the adhesive device comprises said adhesive and said adhesive carrier.

8. The method according to claim 5, further comprising receiving said ring shape on said shaping device, where said adhesive is configured to be liquid or powdery and is applied at least in sections onto said ring shape by at least one of brushing, spraying or electrostatic attraction.

9. A method operatively associated with a number of devices for producing a compressed strand from an insulated wire, comprising the steps of:
- shaping said insulated wire into a half-loop shape in a shaping device;
- partially stripping insulation from the insulated wire by an insulation stripping device;
- acting upon said half-loop shape with an adhesive;
- twisting said half-loop shape into a wire packet in a twisting device; and
- compacting said wire packet in a compacting device;
- wherein the number of devices includes an adhesive device, the shaping device, the stripping device, the twisting device, and the compacting device.

10. The method according to claim 9, further comprising receiving said half-loop shape on said shaping device, where said shaping device forms an interior space together with said half-loop shape and introducing said adhesive into said interior space.

11. The method according to claim 9, further comprising introducing said adhesive device into said interior space, wherein said adhesive is arranged on an adhesive carrier, where the adhesive device comprises said adhesive and said adhesive carrier.

12. The method according to claim 9, further comprising receiving said half-loop shape on said shaping device, where said adhesive is configured to be liquid or powdery and is applied at least in sections onto said half-loop shape by at least one of brushing, spraying or electrostatic attraction.

13. A method for producing an electric motor, comprising:
- forming a stator, where said stator is equipped with at least one compressed strand,
- forming said compressed strand by:
  - shaping said insulated wire into a coil shape in a shaping device;
  - partially stripping insulation from the insulated wire by an insulation stripping device;
  - acting upon said coil shape with an adhesive;
  - twisting said coil shape into a wire packet in a twisting device; and
  - compacting said wire packet in a compacting device;
  - wherein the number of devices includes an adhesive device, the shaping device, the stripping device, the twisting device, and the compacting device.

14. A method for producing an electric motor, comprising:
- forming a stator, where said stator is equipped with at least one compressed strand,
- forming said compressed strand by:
  - shaping said insulated wire into a ring shape in a shaping device;
  - partially stripping insulation from the insulated wire by an insulation stripping device;
  - acting upon said ring shape with an adhesive;
  - twisting said ring shape into a wire packet in a twisting device; and
  - compacting said wire packet in a compacting device;
  - wherein the number of devices includes an adhesive device, the shaping device, the stripping device, the twisting device, and the compacting device.

15. A method for producing an electric motor, comprising:
- forming a stator, where said stator is equipped with at least one compressed strand,
- forming said compressed strand by:
  - shaping said insulated wire into a half-loop shape in a shaping device;
  - partially stripping insulation from the insulated wire by an insulation stripping device;
  - acting upon said half-loop shape with an adhesive;
  - twisting said half-loop shape into a wire packet in a twisting device; and
  - compacting said wire packet in a compacting device;
  - wherein the number of devices includes an adhesive device, the shaping device, the stripping device, the twisting device, and the compacting device.

* * * * *